(12) United States Patent
Jasmin, Jr. et al.

(10) Patent No.: US 8,653,737 B2
(45) Date of Patent: Feb. 18, 2014

(54) CONTROLLER FOR SEMICONDUCTOR LIGHTING DEVICE

(75) Inventors: Roland Jasmin, Jr., Lake Oswego, OR (US); Bonnie A. Larson, Hillsboro, OR (US)

(73) Assignee: Phoseon Technology, Inc., Hillsboro, OR (US)

( * ) Notice: Subject to any disclaimer, the term of this patent is extended or adjusted under 35 U.S.C. 154(b) by 299 days.

(21) Appl. No.: 12/423,573

(22) Filed: Apr. 14, 2009

(65) Prior Publication Data
US 2010/0259187 A1  Oct. 14, 2010

(51) Int. Cl.
*H05B 37/02* (2006.01)
(52) U.S. Cl.
USPC .................. 315/149; 315/152; 315/294
(58) Field of Classification Search
USPC .................. 315/291, 294, 312, 149–159
See application file for complete search history.

(56) References Cited

U.S. PATENT DOCUMENTS

| | | | |
|---|---|---|---|
| 3,818,266 A * | 6/1974 | Vital et al. ............. | 315/151 |
| 5,857,767 A | 1/1999 | Hochstein | |
| 5,936,353 A | 8/1999 | Triner et al. | |
| 5,949,064 A * | 9/1999 | Chow et al. ............. | 250/214 LS |
| 6,200,134 B1 | 3/2001 | Kovac et al. | |
| 6,457,823 B1 | 10/2002 | Cleary et al. | |
| 6,501,084 B1 | 12/2002 | Sakai et al. | |
| 6,683,421 B1 | 1/2004 | Kennedy et al. | |
| 6,692,250 B1 | 2/2004 | Decaudin et al. | |
| 7,369,384 B2 * | 5/2008 | Inaba ..................... | 361/91.1 |
| 7,781,979 B2 * | 8/2010 | Lys ........................ | 315/185 S |
| 7,959,320 B2 * | 6/2011 | Mueller et al. ........... | 362/231 |
| 8,188,678 B2 * | 5/2012 | Siessegger ............. | 315/294 |
| 2001/0046652 A1 | 11/2001 | Ostler et al. | |
| 2002/0187454 A1 | 12/2002 | Melikechi et al. | |
| 2003/0043582 A1 | 3/2003 | Chan et al. | |
| 2003/0081096 A1 | 5/2003 | Young | |
| 2005/0140315 A1 * | 6/2005 | Baldwin et al. ........... | 315/308 |

(Continued)

FOREIGN PATENT DOCUMENTS

DE  19619154 A1  6/1997
DE  10127171 A1  12/2001

(Continued)

OTHER PUBLICATIONS

Data Sheet for G*SiC Technology Super Blue LEDs No. C430-CB290-E1200, manufactured by Opto Semiconductors, May 1, 1999, 8 pages.

(Continued)

*Primary Examiner* — Tung X Le
(74) *Attorney, Agent, or Firm* — Alleman Hall McCoy Russell & Tuttle LLP

(57) ABSTRACT

A semiconductor lighting device has an array of semiconductor light sources arranged in an x-y grid, a power input in electrical connection with the array and arranged to provide power to the light sources, a microcontroller in electrical connection with the array arranged to alter operation of the array as necessary, and a connector in electrical connection with the microcontroller, arranged to provide an interface to the microcontroller. The semiconductor lighting device has a first interface to allow a first level of access to the microcontroller by an end user, a second interface to allow a second level of access to the microcontroller for maintenance operations, and a third interface to allow a third level of access to the microcontroller during production.

20 Claims, 4 Drawing Sheets

(56) References Cited

U.S. PATENT DOCUMENTS

| | | | |
|---|---|---|---|
| 2005/0236998 A1* | 10/2005 | Mueller et al. | 315/51 |
| 2006/0181862 A1* | 8/2006 | Pohlert et al. | 362/3 |
| 2006/0233501 A1 | 10/2006 | Sampson | |
| 2007/0236159 A1* | 10/2007 | Beland | 315/312 |
| 2009/0147028 A1* | 6/2009 | Sefton et al. | 345/690 |
| 2009/0251837 A1* | 10/2009 | Fiebrich et al. | 361/93.9 |
| 2011/0012514 A1* | 1/2011 | Olson et al. | 315/152 |
| 2011/0273377 A1* | 11/2011 | Merz | 345/173 |
| 2012/0088408 A1* | 4/2012 | Stenmark et al. | 439/625 |

FOREIGN PATENT DOCUMENTS

| | | |
|---|---|---|
| EP | 0879582 A1 | 11/1998 |
| EP | 1158761 A1 | 11/2001 |
| WO | 9507731 A1 | 3/1995 |
| WO | 0059671 A1 | 10/2000 |
| WO | 0067048 A2 | 11/2000 |
| WO | 0211640 A2 | 2/2002 |
| WO | 0213231 A2 | 2/2002 |
| WO | 03023875 A2 | 3/2003 |

OTHER PUBLICATIONS

Data Sheet for 5.0 mm Blue Series LEDs No. LNG992CFB, manufactured by the Panasonic Corporation, Mar. 2001, 1 page.

Data Sheet for 3.0 mm Blue Series LEDs No. LNG997CKB, manufactured by the Panasonic Corporation, Mar. 2001, 1 page.

Data Sheet for G*SiC Technology Ultraviolet LEDs No. C395-MB290-E0400, manufactured by Cree, Inc., 2 pages.

* cited by examiner

CONTROLLER FOR SEMICONDUCTOR LIGHTING DEVICE

BACKGROUND

Semiconductor based lighting devices may take many forms, including laser diodes and light emitting diodes. These devices generally emit light in response to energy differentials between layers of semiconductor materials doped in particular ways. They have many advantages over traditional arc lamp-based sources, being more robust, generally cooler, and consuming less power.

In some examples of these lighting devices, the semiconductor light sources are arranged in x-y grids of light sources, where x and y could be any integer 1 or higher. In other examples, several of these x-y grids may be arranged into larger x-y grids to provide arrays of light sources. Because of the ability to mount these devices in wiring patterns as desired, the lighting devices have some configurable and customizable aspects to them.

Currently, there are some limitations on the customization and configurability of these arrays of light sources. Typically, once the arrays are set, tested and configured at manufacture, the resulting lighting product ships to the customer with limited control or monitoring able to be done by the customer. A lighting product generally consists of the array or arrays of light sources mounted in packaging with the necessary components, such as power controls such as circuit substrates, thermal controls such as thermal switches, light source controls such as ON/OFF, intensity, etc. The customer has very little control over the operation or configurability of the product once received. While this 'plug and play' mode is generally desirable, it makes servicing malfunctioning products difficult and prevents the customers from having flexible lighting products.

In some solutions, there is a controller unit that can connect to the lighting product through a connector. This controller may be able to make some minor modifications to the operation of the lighting product. However, these controllers are typically large units separate from the lighting product and have very limited functionality.

DETAILED DESCRIPTION

Figure 1:
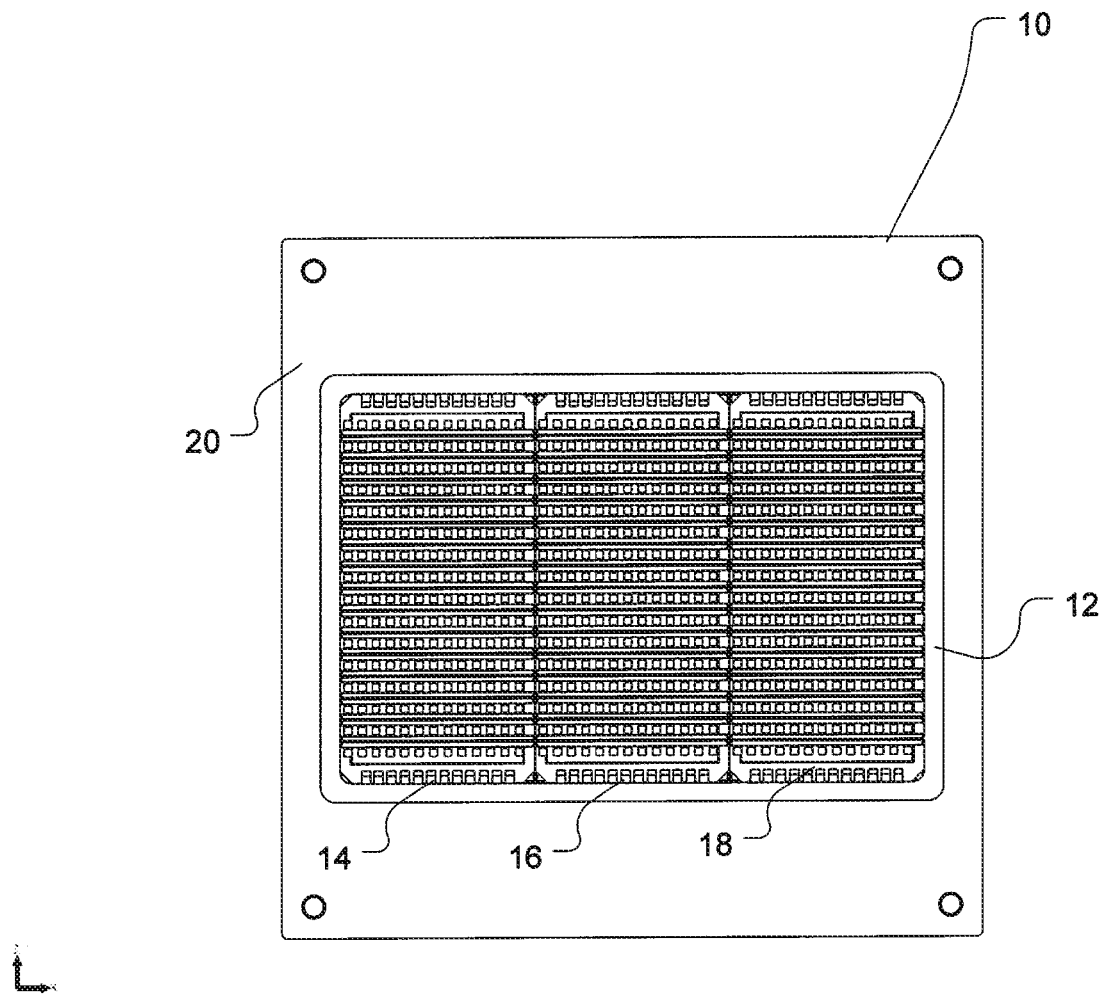
FIG. 1 shows a front view of an embodiment of a lighting device.

FIG. 1 shows a front view of an embodiment of a lighting device 10. The lighting device in this example consists of a light module 12 and its associated control, power and cooling subsystems, some of which will be discussed in more detail later. The light module 12 in turn consists of an array of semiconductor light sources, which may result in the lighting device being referred to as a semiconductor lighting device. The light sources are generally arranged in an x-y grid of columns and rows.

The array shown here actually consists of three subarrays such as 14, 16 and 18, arranged into one larger array, but no limitation is intended nor should it be implied by any particular arrangement of sub-arrays, or any particular range of numbers of columns and rows. The array may consist of any number of columns and rows, with x and y being any integer number 1 or higher. In this embodiment, the face plate 20 holds and protects the light module and will generally face the working surface to which the light will be directed.

Figure 2:
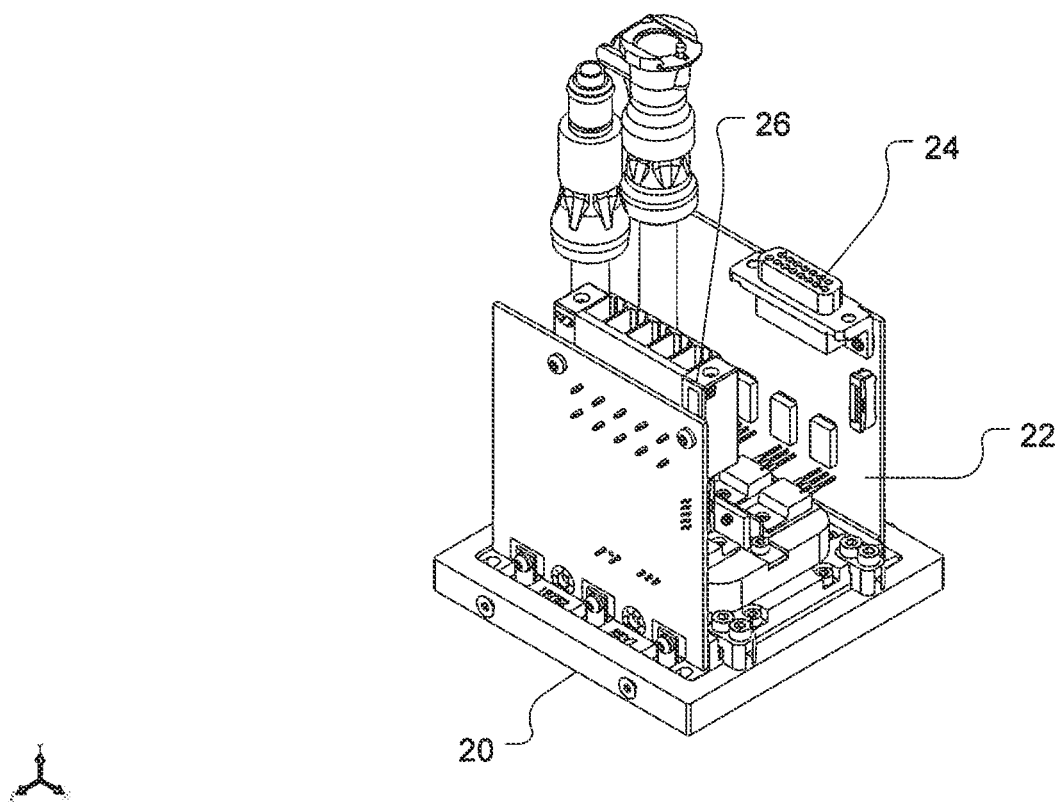
FIG. 2 shows a perspective view of portions of an embodiment of a lighting device.

FIG. 2 shows a side perspective view of the light module 10. In this view, the faceplate 20 faces downwards. The case for this lighting device is shown as being transparent to reveal the power, control and cooling structures or subsystems inside the lighting device. This discussion will focus on the control structure, generally embodiment in the circuit substrate 22. Typically, the circuit substrate 22 will consist of a printed circuit board, but other circuit substrates are of course possible.

Interface to the control circuit will generally be made possible by a connector of some sort. In this embodiment, a Dsub15 connector 24 is shown and discussed. No limitation to such a connector is intended nor should any be implied. In some embodiments, a separate connector 26 may be used to provide power to the light module shown as 12 in FIG. 1. However, that is merely an option. The connector 24 may provide power to the circuit substrate, the cooling system and the light module; each of these may have their own power; or any combination thereof.

Figure 3:
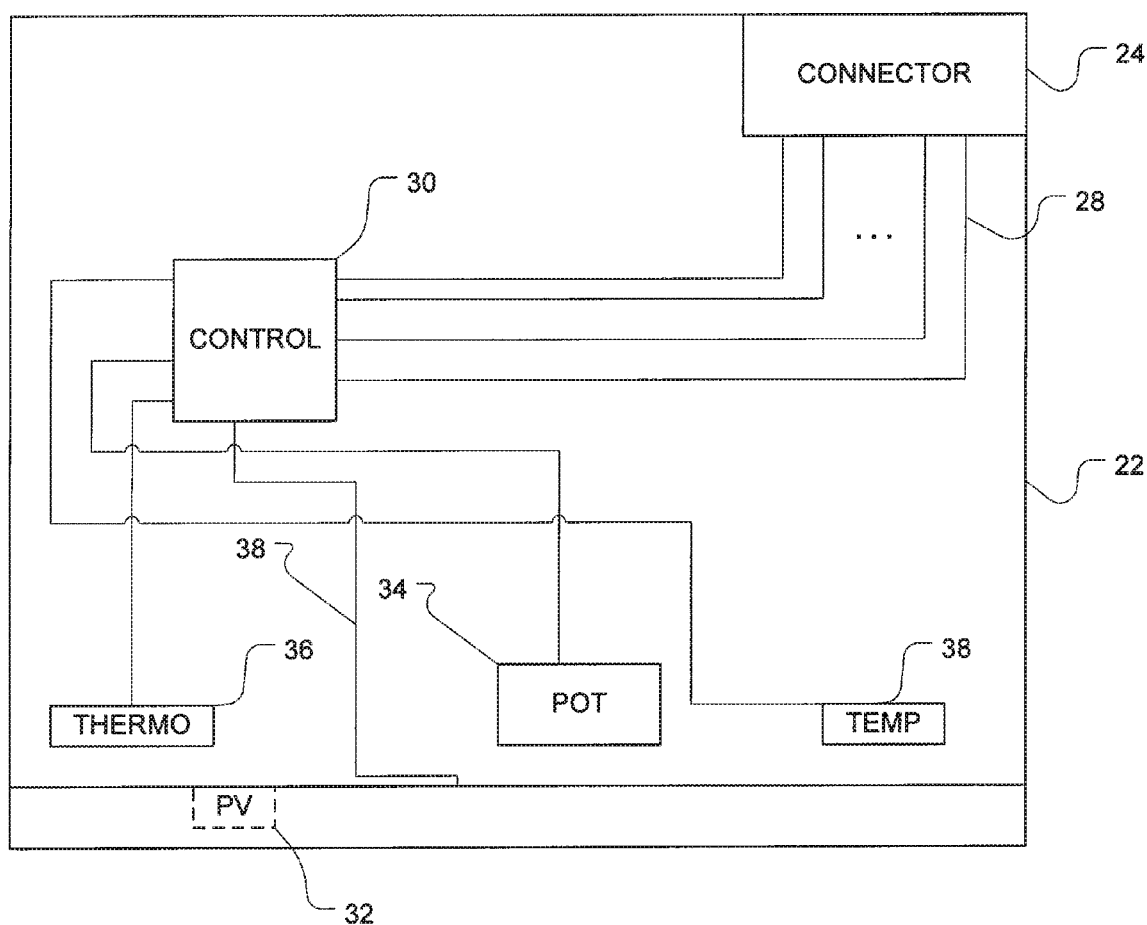
FIG. 3 shows an embodiment of a microcontroller and connector circuit.

FIG. 3 shows an example of a circuit substrate such as 22 of FIG. 2, in more detail. In this example, the controller is a microcontroller such as a programmable logic controller (PLC) 30. Again, this is merely one example and should not infer any limitations on the scope of the claims. The connector in this example has 15 pins, some of which are connected to the microcontroller as noted below. For purposes of this discussion, these 15 pins will have the following pin outs through the connector to an external interface:

| Pin No. | Input/Output | Function |
| --- | --- | --- |
| 1 | Output (O) | Intensity Monitoring |
| 2 | Input (I) | Intensity Control |
| 3 | I | Enable |
| 4 | I | Enable Open Collector |
| 5 | I/O | Thermal Fault |
| 6 | O | +5 VDC Reference |
| 7 | I | Interlock A |
| 8 | GND | GND Temp Monitoring |
| 9 | GND | GND |
| 10 | GND | GND |
| 11 | I/O | SLM Fault |
| 12 | I/O | RS-485 |
| 13 | I/O | RS-485 |
| 14 | I/O | Interlock B |
| 15 | O | Temperature Monitoring |

Intensity monitoring ensures the expected programmed irradiance is actually achieved. The microcontroller may accommodate voltage input from one or more sensors. The sensors may respond to light in particular ranges. In some instances, the output voltage of the sensor is linear with light intensity. The sensor 32 in the lighting device may passively monitor irradiance continuously during light source operation. In some instances, the sensor may be a photovoltaic (PV) sensor that then outputs a voltage that is converted to a Watts/centimeter-squared (W/cm2) measured at the light source. The voltage from the sensor may not be calibrated, so the microcontroller may have to correlate voltage to actual irradiance. This measurement may then be output through the connector to a user interface. The various levels of user interface that may be available will be discussed in more detail later.

The user may input an analog voltage through the intensity control pin to be read by the microcontroller or use the FIFO reference output provided on pin 6. Connection between the connector and the microcontroller may be made through one or more control lines 28. The analog voltage may or may not be limited to a specific range, depending upon the light sources used in the lighting device. In one embodiment, the voltage may be limited to a range of 0.5V to 5.0V direct current (DC). The microcontroller may then convert the voltage to a required current to achieve the desired intensity. In the above example, 0.5V DC would be 10% intensity and 5.0 VDC would be 100%. In embodiments where there is a limited range of voltages, any inputs beyond the desired range may be nullified by not allowing the lighting device to turn on.

In some embodiments, there may be an interface to the microcontroller with a 255-level digital potentiometer 34. This would allow control of the current to the subarrays of the lighting device. This control may be referred to as global control and may be used when several subarrays are assembled together.

The subarrays may consist of individual semiconductor light emitting devices arranged in an x-y grid. An 'array' will refer to a collection of subarrays into a larger x-y grid. The array is then packaged with its thermal and power controls, which will be referred to here as a lighting product or device. The subarrays and the array may be referred to as a semiconductor light matrix, or SLM™. The lighting device may be referred to as containing or consisting of SLM™ technology. Further, a lighting device may consist of an array having only one subarray, so the term 'array' may correspond to 'subarray.'

The "Enable" signal allows the light source to use customer supplied 5 V high input (pin 3), or low input (pin 4). The light sources cannot use both.

Temperature fault monitors a thermostat 36 in the lighting device and sends a thermal fault signal to the user interface when a fault is detected. In one embodiment, the thermostat will be a device that is normally closed. If the temperature becomes too high, the device will open changing its state. This change will signal to the microcontroller that the lighting device is overheated. The microcontroller may then cause at least one of several events to occur include shutting the lighting device off. The events caused by the microcontroller will generally be programmable. For example, the thermal fault condition may be set up so that if the fault occurs 5 times in 5 minutes, the light source should be shut off.

The 5 V DC reference voltage allows the customer to enable the light source for full intensity if no controller is attached.

The interlock A prohibits the enabling of the light source when the interlocks are open. The interlock A is used with pin 14.

The GNDs are used with temperature monitoring (pin 8), and the intensity input, enable input and thermal fault outputs (pins 9 and 10).

SLM™, or semiconductor light matrix, is the lighting module consisting of the array of light sources discussed above. The SLM™ fault input/output allows the microcontroller to read the voltage across each sense resistor in order to determine the current actually sent through each SLM™. This may be compared to the stored value. If the current has deviated by ±10% or other programmable error percentage, the microcontroller will send an SLM fault signal and the light source would not turn on, as one option. Other options are of course possible. Connection between the microcontroller and the array of light sources may be made through one or more control lines such as 28.

Generally, the voltage would only be measured after the voltage has a chance to ramp up to eliminate false errors. This may be accomplished by building in a delay before measuring the voltage. Further conditions may also be specified, such as not being able to be sent when Enable is off or an intensity voltage is set outside a desired range.

Another possible SLM fault condition would be if there is a diode fault. This would result from a diode being open or shorted. The microcontroller may detect this fault by measuring a difference in the voltage of the array when one of the diodes is out.

Yet another possible SLM fault condition enables the user to determine a particular control limit. When the programmed intensity is outside these particular control limits, the microcontroller may send an SLM fault signal. This may prevent the light source from turning on, an error message to the user, etc.

Pins 12 and 13 allow a RS-485 interface to be used to track performance parameters and communicate them through these pins using the RS-485 communication protocol to a user interface. The performance parameters tracked may include: the total ON time, the total number of Enable cycles, total number of interlock events and total number of thermal faults. More sophisticated controllers may also allow tracking of other performance parameters, such as irradiance intensity and any SLM faults, etc.

Pin 15 outputs a voltage corresponding to a temperature usable by a customer-supplied interface. The temperature may be measured from a thermal sensor 38. This is different than detecting a thermal fault, as a thermal fault is detected upon a thermostat being opened and temperature monitoring is merely recording a current temperature.

It should be noted that the various sensors and other control devices, such as the thermostat are shown as being part of the control circuit substrate such as the printed circuit board. This is merely for illustrative purposes and is not intended to limit placement of the sensors to any particular configurations. The sensors merely need to be in electrical connection with the microcontroller to allow the microcontroller to receive the inputs.

The addition of a microcontroller allows for several dynamic adjustments to be made to the operation of the lighting device based upon the lighting device characteristics and the operating conditions. The adjustments made and the levels of access to make those adjustments may be controlled by the programming of the microcontroller. In one embodiment, there are three interfaces with three different levels of access.

A first level of access would be for customers through a customer interface. The customer may be allowed access only through a connector such as the Dsub15 connector to have some inputs to the microcontroller. The inputs may only take the form of analog voltages.

A second level of access would be for field technicians through a second interface. The interface may still center around the Dsub15 connector, with the addition of a graphical user interface on a display device having a touch screen to allow some troubleshooting and onsite adjustments made during testing. This graphical user interface may have the ability to enable light source timer to set an on time, calculate and display the 'dose' or amount of irradiance, and allow the user to customize the desired irradiance levels to set intensity.

A third level of access and a third interface would be at production of the lighting devices. Using a Visual Basic (VB) or HyperTerminal interface, the access level would be to all variables and settings.

In some embodiments, all of these levels of access and interfaces may be the same, depending upon the microcontroller. It is envisioned that the scope of the claims include much more sophisticated controllers including digital signal processors and/or general purpose processors.

Figure 4:
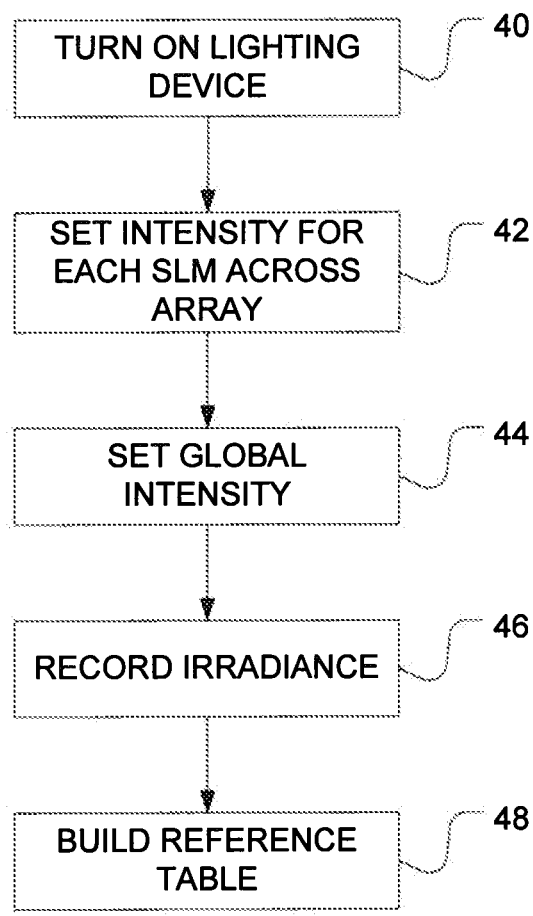
FIG. 4 shows an embodiment of a method to monitor intensity across a lighting array.

Having this capability, the lighting device can be adjusted to meet particular operating parameters. One example of such an adjustment method is shown in FIG. 4. In this particular embodiment, the microcontroller is used to balance the irradiance across the lighting device at production. However, it is possible for this balancing to be done at either the field service or at the customer site.

At 40, the lighting device is turned on. In this instance, the light source array consists of several subarrays or SLMs. Each SLM is set through a non-volatile digital potentiometer that sets the intensity for each SLM across the array at 42.

Once each SLM is balanced, the global intensity of the light source is set at 44. In the examples above, this would be set through pin 2, intensity control, of the connector. To enable monitoring of the irradiance across the array, the light source irradiance is then recorded at production checkout at 46 to establish the relationship between the set currents and corresponding externally measured irradiance per SLM. This is then used to build a look-up table or other means to correlate the internal photovoltaic sensor to a known irradiance for a given current, mentioned earlier, at 48.

This is merely one example of a monitoring and adjustment process. Many other processes become enabled by the presence of a microcontroller. For example, many lighting devices may be arranged together, referred to here as daisy chaining. A microcontroller would monitor and control daisy chained light sources. In one embodiment a single connector would control and monitor the light sources such as enable, intensity, temperature fault, SLM fault and open interlock. In addition to global control, the microcontroller could give the ability to identify and enable each light source individually in future embodiments.

In the embodiment mentioned above, where the customer interface is limited to a particular level of access, the customer would not be able to determine which light source has failed in the case of an SLM fault signal. The production interface would be able to identify which light source faulted and for what reason. In other embodiments with different microcontrollers and possibly higher pin counts and more control, the customer may be able to make that determination at their site.

Related to this, the microcontroller may enable SLM scanning. The microcontroller may input the Enable signal and would send separate Enable signals to each SLM. This would allow scanning through the SLMs while monitoring light measured at a sensor. This would allow determination of a failed SLM.

The microcontroller may also monitor the power supply voltage and output that value to the touch panel graphical user interface, such as that at the field interface.

In addition to the enable/not enable of the light source based upon a voltage input, the microcontroller may allow for dynamic adjustment of power to the light sources to boost the irradiance output.

The microcontroller can monitor the voltage from a thermal sensor and regulate the intensity of the light source to maintain a constant light output. As the light source heats up, the light source performance may degrade, so the power is increased to adjust the irradiance output. As the thermal control of the device reaches equilibrium, the power regulates the intensity of the light source to maintain the constant light output. This feature can be enabled and disabled as desired.

The microcontroller would also allow customers to control light sources that are not daisy chained together. The customer could use the microcontroller to control multiple light sources in parallel without daisy chaining through the customer's own data interface. In this case, the customer would have the freedom to operate multiple devices in parallel as one lighting device, without daisy chaining them together.

In addition to monitoring the irradiance of the SLMs for reporting purposes, the light sensor may be used to autocorrect for a drop in intensity over time. The microcontroller would control the power to the arrays to ensure that the output irradiance stays within some predefined range. When the output irradiance drops and the power limit has been reached, the sensor would report to the microcontroller and it could take one of several actions, including shutting down the light source.

Similarly, the microcontroller could monitor a voltage at a field effect transistor. When the FET voltage drops below a predefined voltage, the microcontroller would send an SLM fault to turn the lighting device off.

All of these features would be available to a system having a microcontroller, not currently available in lighting products. However, employing the techniques and methods of this invention as set out in the claims, these embodiments become possible.

Although there has been described to this point a particular embodiment for a method and apparatus for a lighting device having a microcontroller, it is not intended that such specific references be considered as limitations upon the scope of this invention except in-so-far as set forth in the following claims.

What is claimed is:

1. A semiconductor lighting device, comprising:
an array of semiconductor light sources arranged in an x-y grid;
a power input in electrical connection with the array and arranged to provide power to the light sources;
a photovoltaic sensor continuously monitoring irradiance of the array during operation;
a microcontroller in electrical connection with the array and the photovoltaic sensor and arranged to alter operation of the array as necessary, the microcontroller storing a look-up table correlating irradiance measured by the photovoltaic sensor to a programmed irradiance for a set current, and having an array fault signal input and an enable signal output that only enables the array in the absence of the array fault signal; and
a connector in electrical connection with the microcontroller, arranged to provide an interface to the microcontroller.

2. The semiconductor lighting device of claim 1, further comprising a thermostat in electrical connection with the microcontroller.

3. The semiconductor lighting device of claim 1, wherein the microcontroller is configured to keep the irradiance of the light sources within a predefined range by controlling power output to the light sources based on the irradiance measured by the photovoltaic sensor.

4. The semiconductor lighting device of claim 1, further comprising a temperature sensor in electrical connection with the microcontroller.

5. The semiconductor lighting device of claim 1, further comprising an adjustable potentiometer in electrical connection with the microcontroller.

6. The semiconductor lighting device of claim 1, wherein the connector provides the interface to the microcontroller external to the lighting device.

7. A semiconductor lighting device, comprising:
- an array of semiconductor light sources arranged in an x-y grid;
- a power input in electrical connection with the array and arranged to provide power to the light sources;
- a photovoltaic sensor continuously monitoring an irradiance of the light sources during operation;
- a microcontroller in electrical connection with the array, the photovoltaic sensor, and the power input, the microcontroller arranged to alter operation of the array as necessary and storing a look-up table correlating irradiance measured by the photovoltaic sensor to a programmed irradiance for a set current, the microcontroller having an array fault signal input and an enable signal output that only enables the array in the absence of the array fault signal;
- a first interface to allow a first level of access to the microcontroller by an end user;
- a second interface to allow a second level of access to the microcontroller for maintenance operations; and
- a third interface to allow a third level of access to the microcontroller during production.

8. The semiconductor lighting device of claim 7, wherein the first interface comprises a customer interface and the first level of access comprises control of voltages to the microcontroller.

9. The semiconductor lighting device of claim 7, wherein the second interface comprises a field interface and the second level of access comprises a subset of available variables and settings.

10. The semiconductor lighting device of claim 7, wherein the third interface comprises a production interface and the third level of access comprises all variables and settings for the lighting device.

11. The semiconductor lighting device of claim 7, wherein x and y are integers greater than 1, and wherein the array of light sources comprises at least two separate lighting devices daisy chained together to operate as one lighting device.

12. The semiconductor lighting device of claim 7, wherein the array of light sources comprises at least two separate lighting devices operating in parallel to act as one lighting device.

13. A method for operation of a semiconductor lighting device, comprising:
- prior to operation of the device, building a reference table correlating intensity of an array of light sources arranged in an x-y grid to an irradiance emitted from each of the light sources in the array as measured by a photovoltaic sensor, for storage in memory of a microcontroller; and
- during operation of the device, monitoring the irradiance of the array of light sources with the photovoltaic sensor.

14. The method of claim 13 further comprising, during operation of the device, maintaining the irradiance of each light source within a predefined range for a set intensity by adjusting power output to the array based on the reference table and the irradiance measured by the photovoltaic sensor.

15. The method of claim 14, further comprising automatically correcting for a drop in intensity over time based on the reference table and the irradiance measured by the photovoltaic sensor.

16. The method of claim 15, further comprising outputting the measured irradiance from the microcontroller to a user interface.

17. The method of claim 14, further comprising monitoring a voltage from a thermal sensor sensing heat of the array, and adjusting power output to the array based on the voltage from the thermal sensor to maintain a constant light output.

18. The method of claim 14, further comprising:
- determining a current at each light source of the array; and
- sending a fault signal to the microcontroller for a light source if the current at the light source has deviated from a current corresponding to the set intensity by at least a programmed error percentage.

19. The method of claim 18, further comprising sending an enable signal from the microcontroller to each light source only in the absence of the fault signal for that light source.

20. The method of claim 14, further comprising setting the intensity of each light source by sending voltages set at a customer interface to the microcontroller via a connector.

* * * * *